United States Patent [19]

Noland, deceased

[11] Patent Number: 4,675,823

[45] Date of Patent: Jun. 23, 1987

[54] GROUND PROXIMITY WARNING SYSTEM GEOGRAPHIC AREA DETERMINATION

[75] Inventor: Lyle J. Noland, deceased, late of Bellevue, Wash., by Betty L. Noland, administrator

[73] Assignee: Sundstrand Data Control, Inc., Redmond, Wash.

[21] Appl. No.: 560,073

[22] Filed: Dec. 9, 1983

[51] Int. Cl.[4] .................. G01C 21/00; G06F 15/50
[52] U.S. Cl. .................................. 364/460; 364/449; 340/963; 340/970; 342/65
[58] Field of Search ............... 364/457, 462, 461, 449, 364/456, 439, 460; 343/7 TA, 112 CA; 340/996, 961, 974

[56] References Cited

U.S. PATENT DOCUMENTS

| | | | |
|---|---|---|---|
| 4,179,693 | 12/1979 | Evans et al. | 364/443 X |
| 4,224,669 | 9/1980 | Brame | 364/460 |
| 4,360,876 | 11/1982 | Girault et al. | 364/443 |
| 4,495,580 | 1/1985 | Keearn | 364/450 |

Primary Examiner—Felix D. Gruber
Assistant Examiner—Thomas G. Black
Attorney, Agent, or Firm—Mason, Kolehmainen, Rathburn & Wyss

[57] ABSTRACT

A ground proximity warning system utilizes geographic position data to alter the warning criteria as is required by the terrain features of particular geographic areas. To determine whether the aircraft is within a particular geographic area, the world is subdivided into latitude bands that are in turn subdivided into non-overlapping zones by predetermined lines of longitude, with the position of each zone being defined by the latitude and longitude coordinates of one of its corners. The zones are further defined by regions which may overlap other zones. The regions are limited in size, and their positions are also defined by the locations of one of their corners. The regions are further subdivided into one or more geographic areas that are defined by their shapes and locations within the region. Inputs from the navigational system of the aircraft are used successively to determine whether the aircraft is in a particular latitude band, zone, region and area, and adjustments to the warning criteria are made to optimize the performance of the warning system for the area in which the aircraft is flying. A "snapshot" is made over known territory to verify the validity of the barometric altitude signal before any modification to the warning criteria is made.

43 Claims, 6 Drawing Figures

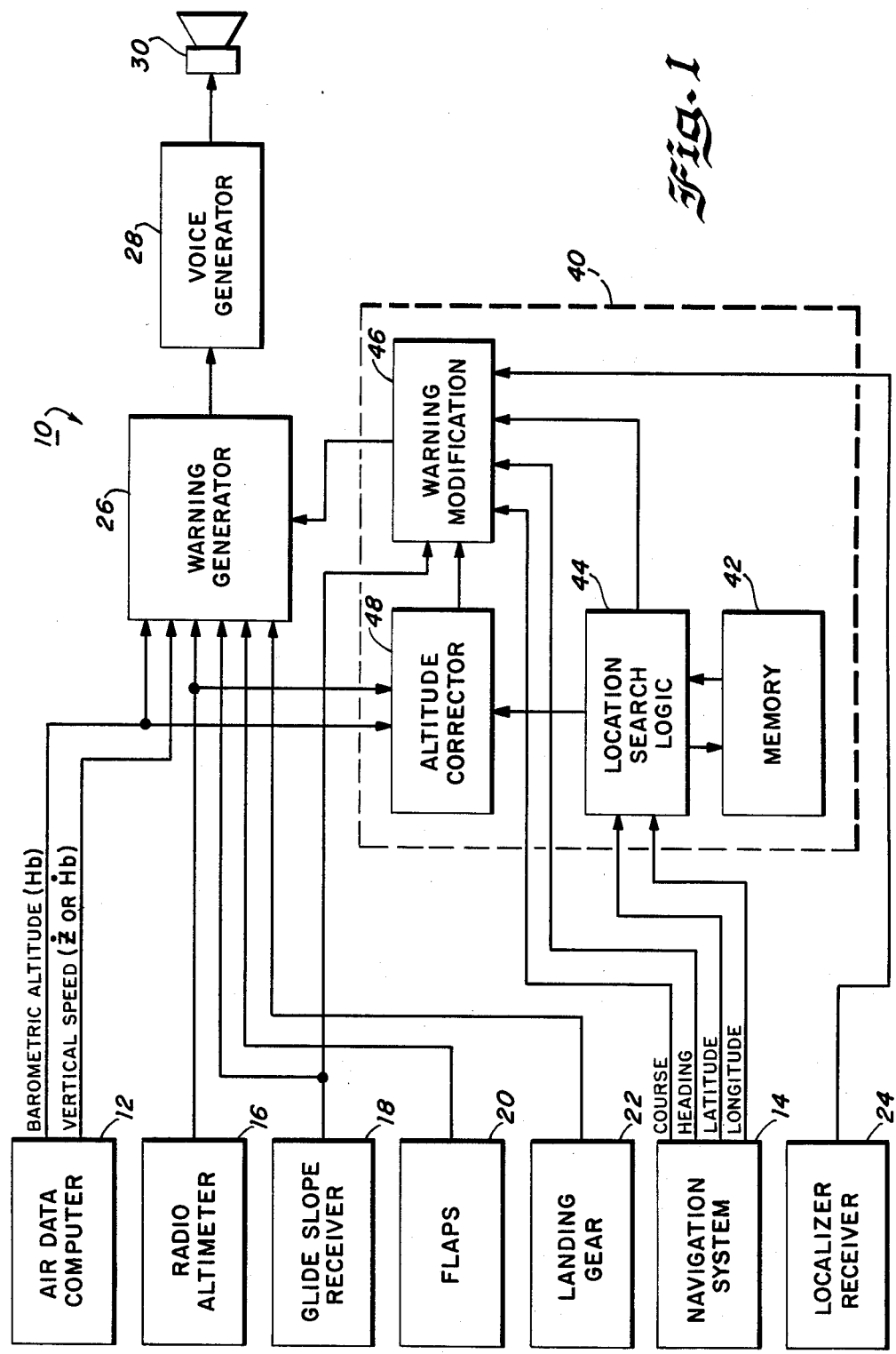

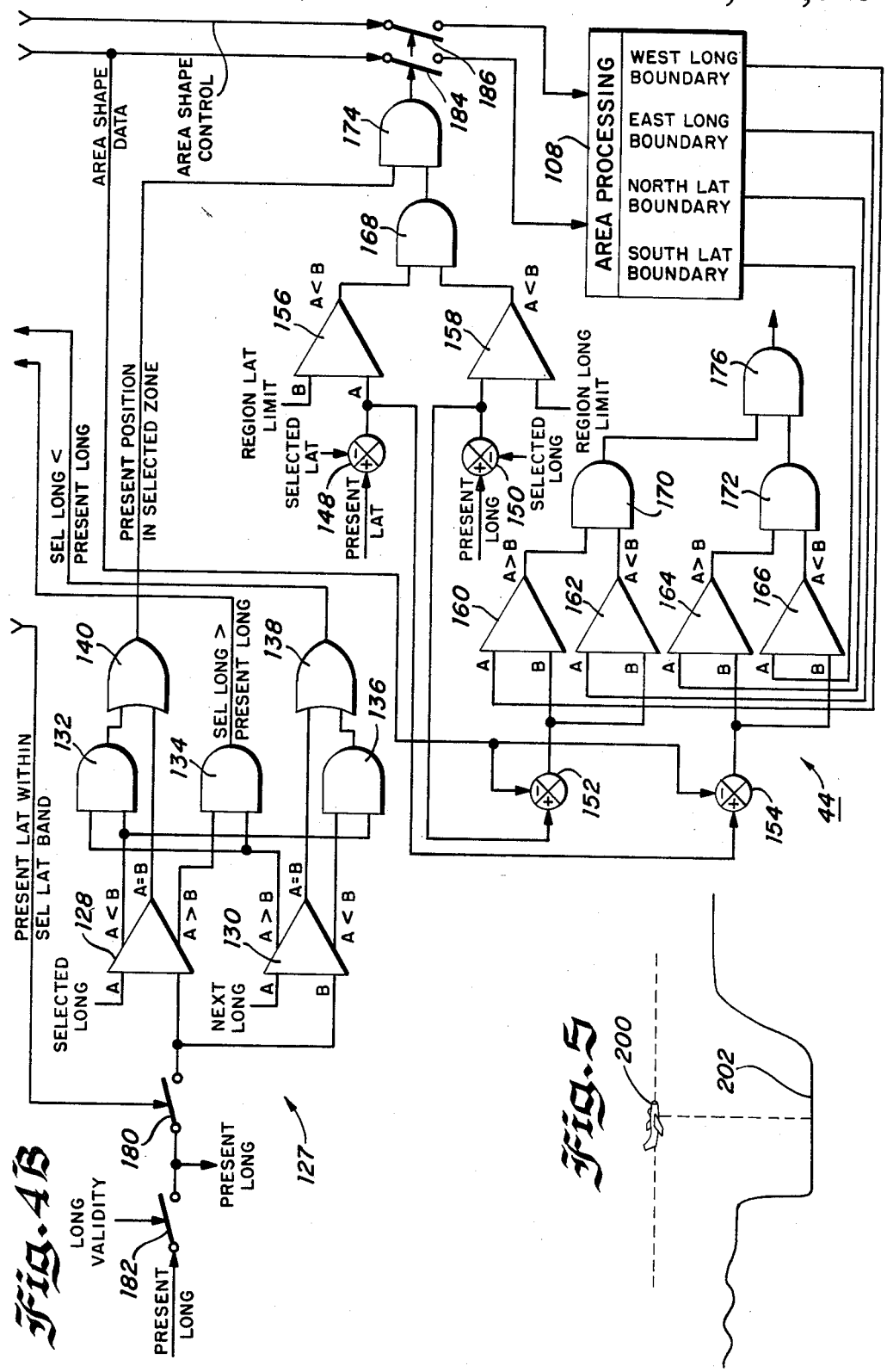

GROUND PROXIMITY WARNING SYSTEM GEOGRAPHIC AREA DETERMINATION

BACKGROUND OF THE INVENTION

1. Field of the Invention

This invention relates generally to systems for advising the pilot of a vehicle such as an aircraft or a submarine of the proximity of obstacles or terrain in the path of the vehicle, and more particularly to a system that utilizes navigationally derived position data as well as barometric and radio altitude and rate data, glide slope signals and other flight parameters, and issues an advisory or a warning to the pilot in the event of a hazardous flight condition.

2. Description of the Prior Art

Various systems that provide warnings or advisory indications in the event of hazardous flight conditions are known. Among such systems are systems generally known as ground proximity warning systems for aircraft that serve to monitor the flight conditions of an aircraft and provide a warning if flight conditions are such that an inadvertent contact with the ground is imminent. Among the flight conditions monitored by such systems are radio altitude and rate, barometric altitude and rate, airspeed, and flap and gear positions. The aforementioned parameters are monitored, and an advisory indication or a warning is generated when the relationship between the aforementioned conditions or parameters is such that ground impact is likely to occur. Typical examples of such systems are disclosed in U.S. Pat. Nos. 3,715,718, 3,936,796, 3,958,218, 3,944,968, 3,947,808, 3,947,810, 3,934,221, 3,958,219, 3,925,751, 3,934,222, 4,060,793, 4,030,065, 4,215,334 and 4,319,218, all assigned to the same assignee as the assignee of the present invention.

While the above-described systems provide advisory and warning signals in the event of proximity to terrain, such systems generate warnings based solely on the flight conditions of the aircraft, and do not utilize navigation information. Consequently, the sensitivity of such systems must be adjusted to provide adequate warnings when a hazardous flight condition exists without generating false or nuisance warnings when there is no danger. Such an adjustment results in a comprise that may still cause nuisance warnings when flying over terrain unique to particular geographic areas, and shorter than desired warning times in other geographic areas.

One attempt to correct some of the above-described disadvantages has been to modify the warning envelopes of the ground proximity warning system in accordance with the geographic location of the aircraft in order to optimize the warning criteria for the particular geographic area over which the aircraft is flying. An example of such a system is described in U.S. patent application Ser. No. 448,862, now U.S. Pat. No. 4,567,483, filed Dec. 10, 1982 by Bateman, et al. and assigned to the same assignee as the assignee of the present invention. In the system disclosed in the aforesaid application, the warning criteria are optimized to suit the terrain characteristics about certain limited areas, particularly the characteristics of particular airports where nuisance warnings and other problems have been encountered. However, due to the logic utilized, the amount of area defining data that can be stored and manipulated is limited.

Another approach utilizing a geographical input is used in U.S. Pat. No. 4,224,669. In the system disclosed in the aforesaid patent, a memory device is employed to store minimum safe altitudes by geographic coordinate areas. A navigational computer is used to determine the position of the aircraft, and a warning is given if the aircraft descends below the stored minimum safe altitude for the coordinate area in which the aircraft is flying. The system has a "worst case" and a "tactical" mode of operation. In the "worst case" mode, the minimum safe altitude is determined as a function of the highest terrain feature or obstacle within the geographic coordinate area of interest. In the "tactical" mode of operation, current flight conditions such as position, ground speed and ground track are used to define a minimum safe altitude based on the height of terrain and obstacles immediately ahead of the projected flight path.

While these systems do provide warning of the proximity of terrain or obstacles, the system described in the aforesaid Bateman application only provides optimized warning criteria for a few areas, particularly airports, and still utilizes compromise type warning criteria in most other areas. The system described in U.S. Pat. No. 4,224,669 simply defines a minimum altitude based on the operating conditions of the aircraft and its location, rather than providing a warning when the interrelationships between various flight parameters are such that a hazardous flight condition is indicated.

SUMMARY OF THE INVENTION

Thus, it is an object of the present invention to provide a warning system that overcomes many of the disadvantages of the prior art systems.

It is another object of the present invention to provide a warning system that provides an advisory indication or a warning in the event of a hazardous flight condition, and which alters the criteria required to generate a warning as a function of navigationally derived data representative of the position of the aircraft.

It is another object of the present invention to provide a ground proximity warning system that stores data representative of geographic areas in which a modification of the warning criteria is desirable, and utilizes navigational information to alter the criteria when the aircraft is operating in such areas.

It is yet another object of the invention to provide a warning system that stores data representative of the areas wherein warning criteria modifications are required in terms of latitude bands, latitude-longitude zones, regions and areas, and successively determines the latitude band, zone, region and area in which the aircraft is operating to determine whether a modification of the warning criteria is to be made.

It is yet another object of the present invention to provide a warning system that stores data representative of geographic areas that pose particular problems in a manner so as to minimize the computation time required to determine whether the aircraft is operating in such an area.

It is another object of the invention to provide a system that monitors the validity of the signals applied to it and modifies the warning criteria only if the signals are valid.

It is yet another object of the present invention to provide a system that minimizes the memory capacity required to store the geographic area representative data.

It is yet another object of the present invention to provide a system that stores the geographic area representative data in such a manner so as to minimize the computation time to manipulate the data.

Briefly, in accordance with a preferred embodiment of the present invention, the world or geographic area of interest is subdivided into latitude bands which are further subdivided into a plurality of non-overlapping zones by predetermined lines of longitude. Each zone contains a region that contains one or more areas wherein the warning criteria must be modified. Each region is limited in size to 5.5 degrees latitude and longitude, but may overlap more than one zone. Each area within a region is defined by its position within the zone and its shape, with the shape being defined as one of several standard shapes, such as a rectangle, a parallelogram, a triangle, a circle, a sector of a circle, an ellipse or other figure.

The aforementioned information is stored in memory, with the locations of the zone, regions and areas being defined by one corner of the zone, region or area, respectively, for example the southwest corner. In addition, areas are defined by size and a code identifying the particular shape of the area. The warning criteria modification required for each area is also stored, as is data indicative of other criteria that must be met before a modification of the warning criteria is permitted.

The use of such a data storage format reduces the quantity of data required to define the various areas, and reduces the calculation time required to determine whether the aircraft is in an area that requires warning criteria modification. The reduction in storage and computation time is accomplished by comparing the position of the aircraft with the stored data first to determine the position of the aircraft with respect to a latitude band, then to a zone, then to a region, and then finally to an area. For example, the latitude of the aircraft, as provided by the navigation equipment, is compared with the latitude boundaries of one of the bands. If it is not within that latitude band, the position is compared with the latitude boundaries of the next band, and so forth until the correct band is located. Then, the present longitude of the aircraft is compared with the longitude boundaries of two adjacent zones, as determined by the longitudes of two corresponding corners of two adjacent zones. The comparison is repeated until the current zone is determined. Next, it is determined whether the aircraft is within a region within the zone, and if so, whether it is within an area within the region. If it is within an area, as defined by the position, size and shape of the area with respect to the region, the appropriate modifications are made to the warning criteria. If there is any ambiguity about the location of the aircraft, or any doubt about the validity of any of the navigation signals or vertical position signals, no modification is made, and the standard warning criteria are utilized.

DESCRIPTION OF THE DRAWING

These and other objects and advantages of the present invention will become readily apparent upon consideration of the following detailed description and attached drawing wherein:

FIG. 1 is a functional block diagram of a ground proximity warning system with geographic area determination according to the invention;

FIGS. 4A and 4B are functional block diagrams of the geographic area determining portion of the system according to the invention; and FIG. 5 illustrates an aircraft flying over a "snapshot" area.

DETAILED DESCRIPTION OF THE DRAWING

Figure 3:
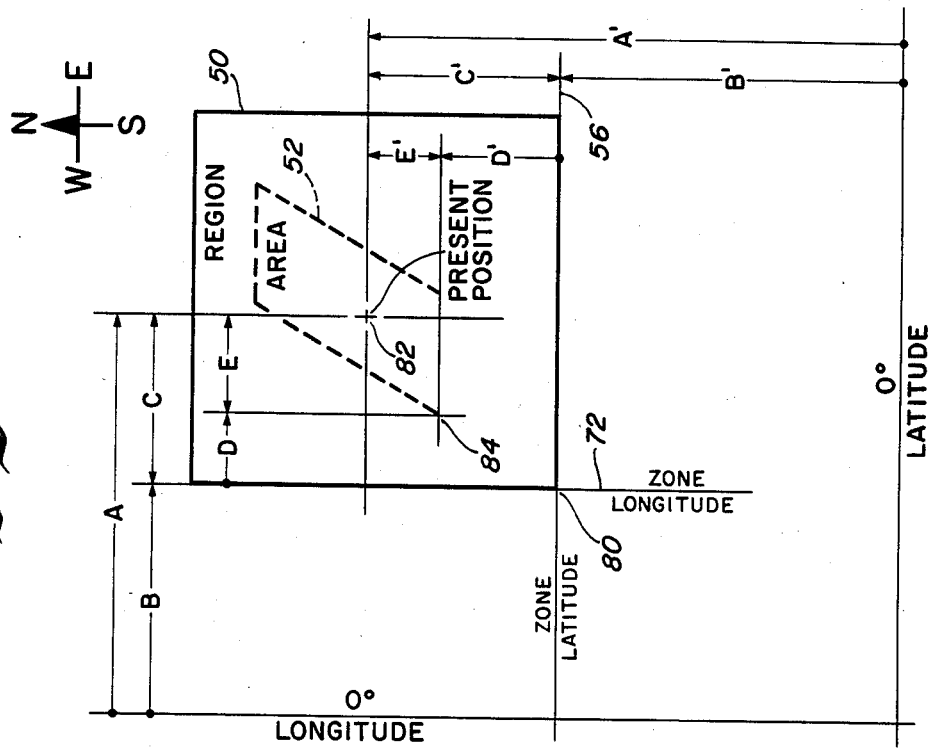
FIG. 3 is an enlarged view of one of the regions illustrated in FIG. 2.

Referring to the drawing with particular attention to FIG. 1, there is illustrated a preferred embodiment of the system according to the invention generally designated by the reference numeral 10. Although the system according to the invention is illustrated as a series of functional blocks for purposes of clarity, it is to be understood that the actual implementation of the system may be other than that specifically shown in FIG. 1, with various analog and digital implementations being possible. The system 10 according to the invention uses data from an air data computer 12 or from a barometric altimeter and a barometric rate circuit present on the aircraft to provide information about the barometric altitude of the aircraft and the vertical speed of the aircraft. The vertical speed may be expressed as a barometric rate $H_b$, or as Z velocity, $\dot{Z}$, which may be obtained from an inertial navigation system. Data is also received from a navigation system 14 on the aircraft to provide information about the course, heading, latitude and longitude of the aircraft. The navigation data may be obtained directly from the navigation system, which may include an inertial navigation system, a satellite navigation receiver, VLF/OMEGA, Loran C, VOR/DME or DME/DME, or from a flight management system. In addition, the system utilizes signals from a radio altimeter 16, a glide slope receiver 18, and discrete signals from discretes 20 and 22 that indicate the position of the flaps and landing gear. In addition, signals from a localizer receiver 24, which indicates whether the aircraft is on the correct course for a landing are used.

In the discussion of the present invention, the system will be described in an aircraft environment; however, the system is also usable for other vehicles that must navigate around terrain, such as, for example, submarines. The signals from the air data computer 12, the radio altimeter 16, the glide slope receiver 18, and the flap and landing gear discretes 20 and 22 are applied to a warning generator 26. The warning generator 26 may form part of a system generally known as a ground proximity warning system, examples of which are disclosed in the previously referenced patents, that initiates a warning when the signals applied thereto indicate a hazardous flight condition. When such a hazardous condition is detected, a warning initiation signal is applied to a voice generator 28 which applies an appropriate voice warning, either directly, or via the aircraft intercommunication system, to a transducer 30 to thereby provide the warning to the pilot.

As previously discussed, the warning generator 26 initiates a warning when various hazardous flight conditions occur. Among the hazardous flight conditions that can cause a warning to be initiated are a negative climb after take-off, an insufficient terrain clearance, an excessive sink rate, an excessive closure rate, and a below glide slope approach. The criteria for initating such warnings are defined by predetermined component values in analog warning generators, and by stored data in digital warning generators, that define the warning criteria in terms that may be graphically represented as graphs known as warning envelopes. Examples of such warning envelopes are disclosed in U.S. Pat. No. 3,936 796, incorporated herein by reference.

As previously discussed, the warning criteria, or warning envelopes of a ground proximity warning system, are tailored to maximize warning times, while minimizing false or nuisance warnings. However, it is impossible to tailor warning envelopes that are optimum for all types of terrain, and consequently, most warning envelopes are the result of a compromise that permits satisfactory performance under most flying conditions, even though they may not be optimized for certain unusual geographic areas.

Thus, in accordance with an important aspect of the invention, there is provided a system 40 that receives signals from the navigation system 14, as well as other signals, and modifies the warning criteria or warning envelope used to initiate a warning by the warning generator 26 in accordance with the geographic location of the aircraft in order to optimize the warning envelopes for unusual terrain characteristics that occur in certain predetermined geographic areas. The system 40 includes a memory 42 that contains the locations and boundaries of the areas that require envelope modification, as well as the warning modifications required. Location search logic 44 is employed to monitor the position of the aircraft so as to determine whether the aircraft is in an area that requires envelope modification. If the aircraft is in such an area, the logic 44 initiates a warning modification via a warning modification circuit 46 that inhibits the modification in the event that certain other criteria are not met. The aforementioned other criteria will be discussed in greater detail in a subsequent portion of the specification. If sufficiently accurate navigation data is available, an altitude corrector 48 may be utilized to correct the barometric altitude reading to correspond to an altitude reading taken by measuring the radio altitude over terrain of known elevation. Otherwise, the warning modifications may simply be inhibited in the event of a discrepancy between the barometric altitude reading and the radio altitude reading over known terrain.

Figure 2:
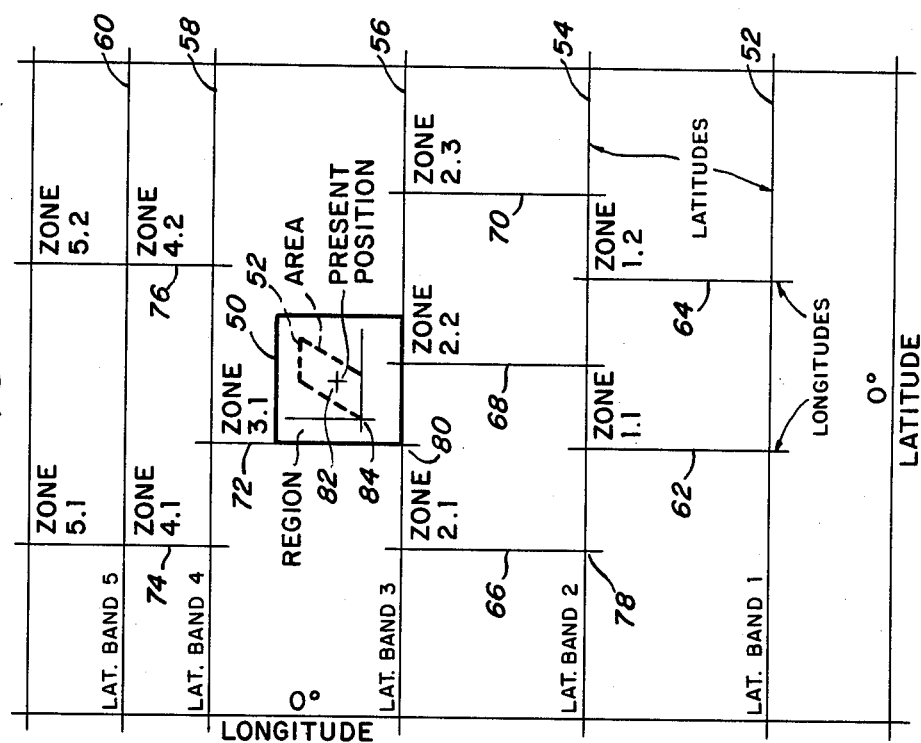
FIG. 2 is a plan view of the earth or a section of the earth as divided into latitude bands, zones, regions and areas by the system according to the invention.

As previously stated, the memory 42 contains the locations and boundaries of the areas wherein warning envelope modification is desirable. The locations of such areas are compared with the present position of the aircraft to determine whether an envelope modification is necessary, and the nature of such a modification. However, to constantly compare the present location of the aircraft with the locations of each of the areas wherein envelope modification is required would require an excessive computing capacity or an excessive computing time that would not be compatible with the physical and time requirements of a ground proximity warning system. Consequently, rather than simply storing the locations and boundaries of the areas that require envelope modification, the world is divided into latitude bands that are further divided into zones by predetermined lines of longitude (FIG. 2). The zones are further divided into regions that may contain one or more areas that require warning envelope modification.

As is illustrated in FIG. 2, the world or other geographic area of interest is divided into a plurality of latitude bands, namely Latitude Band 1 through Latitude Band 5 in FIG. 2. Although five latitude bands are illustrated, any convenient number of latitude bands may be used. Each latitude band is divided into a plurality of zones. The zones need not be of uniform size, however, they cannot overlap each other. The zones illustrated in FIG. 2 are identified by a decimal point number, with the digit to the left of the decimal point corresponding to the number of the latitude band in which the zone is found. The digit to the right of the decimal point indicates the number of the particular zone within the latitude band. Thus, for example, the first zone in Latitude Band 1 is identified as Zone 1.1 and the second zone in Latitude Band 4 is identified as Zone 4.2, etc.

Each zone that contains an area requiring envelope modification is further defined by a region that contains one or more areas that require envelope modification. To facilitate computation, each region is limited in size to a maximum size of 5.5 degrees of latitude and longitude; however, a region may overlap more than one zone. A typical region 50 containing an area 52 is located in Zone 3.1 of FIG. 2. If desired, the longitudinal sizes of the zones (in degrees) may be altered as a function of latitude to increase the number of degrees per zone as the poles are approached in order to maintain the zones substantially equal in area. Such an alteration will result in a reduction in the required memory capacity of approximately thirty percent, and provide uniform size (area) zones over the surface of the earth.

When determining whether an aircraft is in an area requiring envelope modification, it is first determined whether the aircraft is in a particular band, then a particular zone, then a particular region and finally whether it is in an area. The determination is done in this manner in order to reduce the computation time required to determine whether an aircraft is in an area, and to permit the computation to be done in a step-by-step basis so that the microprocessor in the warning system is not tied up for an unduly long time.

When determining when the aircraft is in a particular latitude, the present latitude of the aircraft, as determined by the navigation system 14, is compared with various latitudes defining the latitude bands stored in the memory 42. In FIG. 2, the latitudes 52, 54, 56, 58 and 60 define the lower latitude boundaries of the latitude bands 1, 2, 3, 4 and 5, respectively, and are stored in the memory. When the comparison is done, the present latitude of the aircraft is compared with each of the stored latitudes to determine whether the present latitude is greater than, less than or equal to each stored latitude. If it is equal to one of the stored latitudes, then it is known that the aircraft is within the corresponding band. If it is greater than a particular one of the stored latitudes, for example, latitude 52, a comparison is made between the present latitude of the aircraft and the next stored latitude, for example, latitude 54. If the present latitude is less than the latitude 54, it is known that the aircraft is in Latitude Band 1. If the present latitude position is greater than latitude 54, the present latitude position is compared with the next stored latitude, for example, latitude 56, and the process is repeated until the aircraft is located between two of the stored latitudes.

Once it has been determined that the position of the aircraft is in a particular latitude band, for example, Latitude Band 2, the next step is to determine the zone that the aircraft is in. This is accomplished by storing in the memory 42 longitudes that define boundaries between zones, for example, the longitudes 62, 64, 66, 68, 70, 72, 74 and 76 (FIG. 2) that define the boundaries between zones.

Thus, if we assume that the aircraft is located in Latitude Band 2, the present longitude of the aircraft received from the navigation system 14 is compared successively with each of the longitudes 66, 68 and 70. If the present longitude is less than the longitude 66, the aircraft is not in any of the zones 2.1, 2.2 or 2.3. If the present longitude is equal to the longitude 66, then the aircraft is in Zone 2.1. If the present longitude of the aircraft is greater than the longitude 66 a subsequent comparison is made with the longitude 68. If the present longitude of the aircraft is less than the longitude 68, then the aircraft is in Zone 2.1. If the longitude of the aircraft is greater than the longitude 68, comparisons are made with the next stored longitudes until the position of the aircraft is located within a particular zone. The system remembers the last comparison made, and begins the next subsequent comparison at the stored latitude or longitude immediately following the latitude or longitude of the previous comparison in order to avoid redundant comparisons. Using such a scheme, and because the zones do not overlap, each zone can be readily defined by a single latitude and a single longitude. For example, Zone 2.1 can be defined, for example, by its southwest corner 78, which is defined by the intersection of the latitude 54 and the longitude 66. The other zones can be similarly identified. For example, Zone 3.1 can be identified by its southwest corner 80 which lies at the intersection of the latitude 56 and the longitude 72.

Once it has been determined that the aircraft is located within a particular zone, a determination is made as to whether the aircraft is located in a region containing areas that require warning envelope modification. The size of the region can be defined, for example, by degrees of latitude and longitude, for example, 5.5 degrees latitude and 5.5 degrees longitude, or any other convenient distance. The boundaries of the region can be defined simply by designing the size of the region, and the location of one of its corners. For example, the boundaries of the region 50 (best shown in FIG. 3) may readily be defined by the intersection 80 of the latitude 56 and the longitude 72, which is the same intersection defining the zone boundaries of Zone 3.1. Thus, if the present latitude and present longitude of the aircraft are within, for example, 5.5 degrees of the intersection 80, then the aircraft is within the region 50.

Once it has been established that the aircraft is within the region 50, a determination is made as to whether the aircraft is within one of the areas, such as, for example, the area 52, within the region 50. This determination is made by comparing the present position of the aircraft relative to the latitude and longitude defining the area with the boundaries of the area relative to the region boundaries.

Referring again to FIG. 3, in determining whether the present position 82 of the aircraft is within a region, the present latitude and longitude relative to a base line latitude and longitude, for example zero degrees latitude and zero degrees longitude, is compared with the latitude 56 and longitude 72 defining the intersection 80 relative to the same base line latitude and longitude. In FIG. 3, the present position latitude and longitude relative to a zero degree base line are illustrated by the distance A' and A, respectively. The distances to the latitude 56 and longitude 72 defining the intersection 80 relative to the zero degree base line, which may also be referred to as a zone/region origin, are illustrated by the distances B' and B.

The distances A and A' are determined by the navigational system, and consequently, have a very high resolution. For example, a word having 20-bit precision may be used to define the distances A and A'. However, zones and regions are relatively large, and it is not necessary to define them with such precision. Typically, the zone/region origin 80 may be defined with sufficient precision utilizing only a pair of 8-bit words defining the distances B and B'. Thus, in accordance with another important aspect of the present invention, computation time and microprocessor and memory capacity can be significantly reduced by utilizing only the most significant bits, for example, the eight most significant bits, of the present position data in determining whether the aircraft is within a zone or a region.

However, in order to make the determination as to whether the present position 82 of the aircraft falls within an area, such as the area 52, much greater precision is required; however, handling long words, such as the 20-bit words required to provide adequate resolution, can be cumbersome. Thus, in accordance with another important aspect of the present invention, the necessary precision can be maintained without the use of excessively long words. This is accomplished by truncating the data and utilizing only the least significant digits to determine whether the aircraft is within the area.

Once it has been determined that the aircraft is within a region, the most signficant bits defining the area are no longer required, and the present position of the aircraft can be defined relative to the zone/region origin 80 by the latitudinal and longitudinal distances C and C', respectively (FIG. 3). Since the origin 80 has already been defined by the most significant bits, the position of the aircraft can now be defined by the least significant bits relative to the origin 80. Consequently, for our example of 20-bit resolution, the distances C and C' can be defined by the twelve least significant bits of the 20-bit word because the eight most significant bits have already been used to define the point 80.

The origin 84 of the area 52 is also defined relative to the zone/region origin 80 by the distances D and D'. Once this has been done, it is possible to redefine the present position of the aircraft 82 relative to the area origin 84 by the distances E and E' in order further to shorten the length of the words to be manipulated.

The areas requiring envelope modification may be of various shapes and sizes, and to define the boundary of each area on a point-by-point basis would require a very large amount of memory. Consequently, in accordance with still another aspect of the present invention, each area is approximated by a standard shape that is readily defined mathematically, preferably as a standard geometric shape, by a minimal number of parameters. Examples of such standard geometric shapes are rectangles whose boundaries are parallel to the lines of latitude and longitude, horizontal parallelograms wherein the northern and southern boundaries are parallel to the lines of latitude and the eastern and western boundaries are parallel to each other, vertical parallelograms where the eastern and western boundaries are parallel to the lines of longitude and the northern and southern boundaries are parallel to each other, rotated parallelograms wherein the northern and southern boundaries are parallel to each other and the eastern and western boundaries are parallel to each other, quadrangles which include other four-sided figures, triangles, egg-shaped figures which may be defined by a boundary about a point having a radius specified in terms of degrees of latitude (or longitude), a circle, a sector of circle and other conveniently definable shapes. Thus, to define an area, all that is required is to define the particular shape that best approximates the area and the size of the shape required to approximate the area. Such size and shape information can be defined in relatively few bits.

The area 52 illustrated in FIG. 3 is approximated by a rectangular parallelogram having one of its corners located at the origin 84. By knowing the sizes of the horizontal and slanted sides of the parallelogram, and the angle of offset from the vertical of the slanted sides, the boundary about the area 52 can be readily defined with respect to the origin 84. By comparing the present position of the aircraft 82 relative to the origin 84 with the boundaries of the area 52, it can be readily ascertained whether or not the aircraft is within the area 52.

Because the modification circuitry 40 is designed to operate in the environment of a ground proximity warning system, and because the envelope modification system 40 may share a central processing unit and other devices with the warning generator 26, the computation time required to ascertain the position of the aircraft relative to an area cannot be so long so as to interfere with the warning generation function. Moreover, because the computations required to determine whether the aircraft is within an area that requires envelope modification are relatively lengthy and complicated, random interruptions of the computation by the generation of a warning or by other causes cannot be tolerated. Consequently, to avoid such problems, the computation to determine whether the aircraft is within an area that requires envelope modification is done in a synchronous cycle that cannot be interrupted prior to its completion. However, in order to prevent any computation cycle from taking an excessively long period of time, the computation is broken up into several segments. For example, the computation may be segmented such that during the first computation cycle a determination is made whether the aircraft is within a predetermined latitude band. The computation cycle is then terminated regardless of the outcome of the determination to permit the warning generator to operate. During the next cycle the computation will be limited to determining whether the aircraft is within the next latitude band, or zone, whichever is appropriate, and the computation again terminated regardless of the outcome. After each termination, the system remembers the last stored latitude or longitude with which the present latitude or longitude was last compared. This permits the next comparison to be made with the next successive latitude or longitude without having to start the process over. The process is repeated on a step-by-step basis until the entire computation is completed.

Figure 4A:
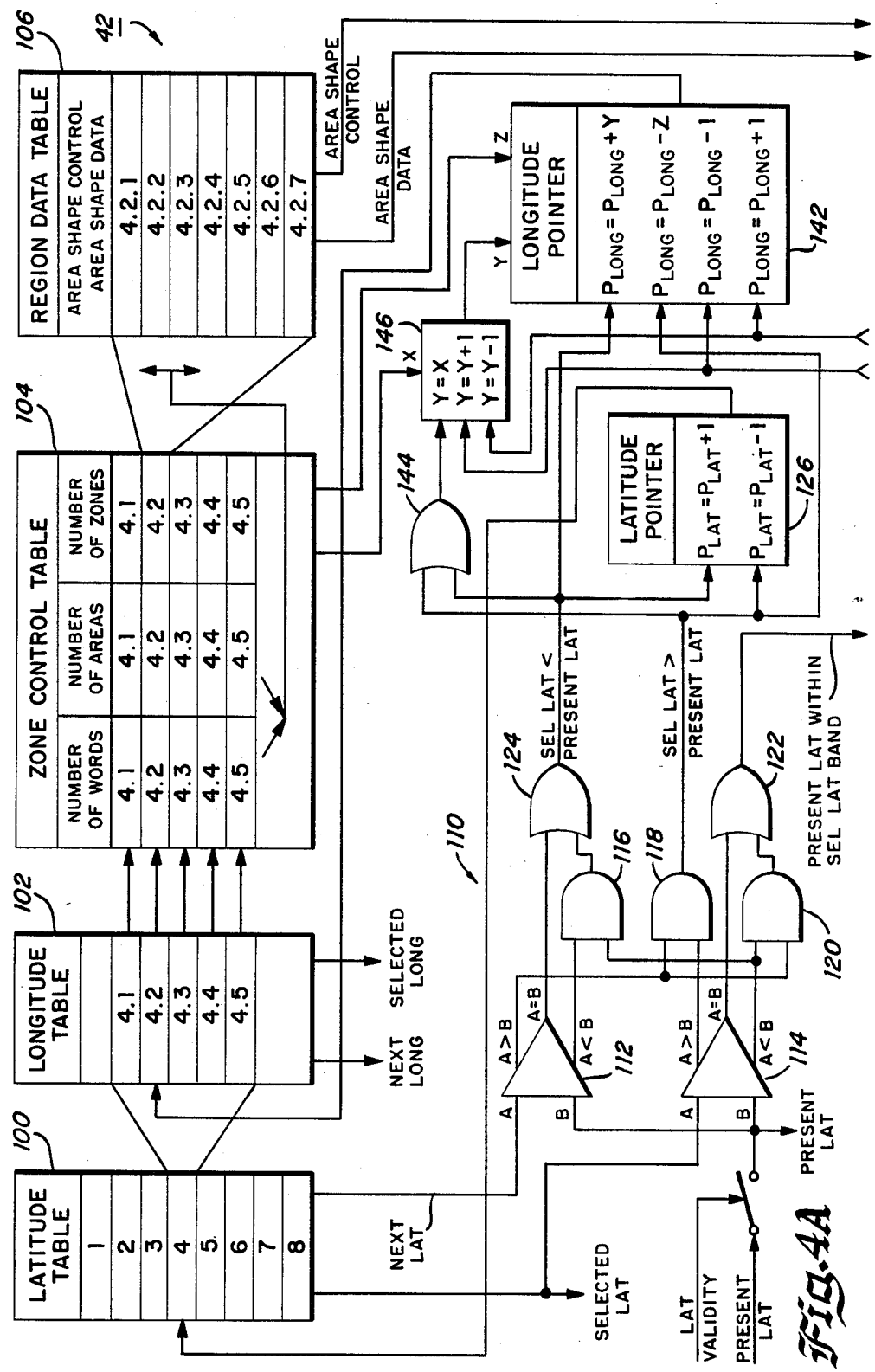

Referring now to FIG. 4, there is shown circuitry corresponding to the memory 42 and the location search logic 44 in greater detail. As in the case of FIG. 1, the circuitry is illustrated in functional block diagram form as a series of functional blocks, comparators, gates and other components, but it should be understood that the functions may be implemented other than as specifically shown in FIG. 4. Moreover, although there may not be an exact one-to-one correspondence between the memory 42 and location search logic 44 in FIGS. 1 and 4, in general, the memory 42 of FIG. 4 includes tables 100, 102, 104 and 106. The location search logic 44 essentially comprises the area processing circuit 108 and the rest of the circuitry of FIG. 4.

Referring to FIG. 4, the location of the aircraft within a latitude band is accomplished in general by the zone latitude table 100 and circuitry 110 which includes a pair of comparators 112 and 114, AND gates 116, 118 and 120, OR gates 122 and 124, and a latitude pointer 126. The longitude comparison is determined by a circuit 127 which includes a pair of comparators 128 and 130, AND gates 132, 134 and 136, OR gates 138 and 140, the zone longitude pointer 142 and the zone longitude table 102. The zones are determined by the zone control table 104, and OR gate 144, additional zone logic 146 and the zone longitude pointer 142. Locations within a region and area are determined by the region data table 104, the area processing circuitry 108, summing junctions 148, 150, 152, 154, comparators 156, 158, 160, 162, 164, 166 and AND gates 168, 170, 172, 174 and 176.

In operation, the latitude band is determined first by the circuitry 110. If the latitude signal is valid, a switch 178 is closed and a signal representative of the present latitude from the navigation system 14 is applied to the comparators 112 and 114. The present latitude is compared with the selected latitude from the zone control table 100 by the comparator 114, and by the next latitude by the comparator 112. The comparators 114 and 116 provide output signals indicative of whether the present latitude is equal to, greater than or less than the selected latitude or the next latitude, respectively. The AND gate 116 and the OR gate 124 cooperate to provide an output at the output of the OR gate 124 if the selected latitude is less than the present latitude. The AND gate 118 provides an output if the selected latitude is greater than the present latitude, and the AND gate 120 and the OR gate 122 cooperate to provide a signal at the output of the OR gate 122 when the present latitude is within the selected latitude band.

If the selected latitude is less than the present latitude, the OR gate 124 applies a signal to the latitude pointer 126 to cause the latitude pointer 126 to point to the next higher latitude in the zone latitude table 100. Similarly, if the selected latitude is greater than the present latitude, the AND gate 118 applies a signal to the latitude pointer 126 to cause the latitude pointer 126 to point to the next lower latitude band in the latitude table 100. The process is repeated until the present latitude is within the selected latitude band, at which point the OR gate 122 applies a signal to a switch 180 to cause the switch 180 to close.

If the longitude signal is valid, a switch 182 is also closed, and the present longitude signal from the navigation system 14 is applied to a pair of comparators 128 and 130. The present longitude is compared with the zone longitudes in the selected band of latitudes obtained from the zone longitude table 102. As is illustrated in FIG. 4, if the aircraft is within Latitude Band 4, the present longitude is compared with the longitudes of the zones within Latitude Band 4, namely the longitudes of Zones 4.1 through 4.5.

The circuit 127 operates in a manner similar to that of the circuit 110 in that it successively compares the present longitude with the selected longitude and next longitude from the longitude table 102. Thus, if the selected longitude is greater than the present longitude, the AND gate 134 causes the zone longitude pointer 142 to point to the next lower longitude in the longitude table 102. Similarly, if the selected longitude is less than the present longitude, the OR gate 138 causes the longitude pointer to point to the next higher longitude in the longitude table 102. In addition, the gates 134 and 138 cooperate with the gate 144 to control the additional zones logic 146. The function of the additional zones logic 146 is to aid in the control of the longitude pointer 142 by providing the longitude pointer 142 with data representative of the number of zones in the selected latitude band, the number of zones to the east of the present zone and the number of zones in the next lower latitude band. The number of zones per latitude band, the number of additional zones and the number of zones per lower latitude band are designated as X, Y and Z, respectively, in FIG. 4. This data must be provided to the pointer because the number of zones is different for the various latitude bands, and the number of zones in the latitude band, or the number of zones that have not yet been pointed to must be provided to control the longitude pointer 142 and the zone control table 104.

Once the zone in which the aircraft is located has been determined, for example, Zone 4.2 in FIG. 4, data pertinent to that zone is retrieved from the zone control table 104. The zone control table contains data to control the manipulation of zone data, and controls the access to the region data table 106. Among the data contained in the zone control table is the number of words, for example 16-bit words, in the region data table that define the shapes and sizes of the areas within the region. In addition, the zone control table defines the number of areas within the zone and region that require modulation, as well as the number of snapshot areas, which will be discussed in a subsequent portion of this specification, in the zone and region. In addition, the zone control table contains data defining the number of zones in each latitude band.

As is illustrated in FIG. 4, the zone control table 104 accesses region data and area shape and size data in the region data table 106. As is illustrated, the region data table 106 contains data defining seven areas within the Zone 4.2, namely areas 4.2.1 through 4.2.7. The data defining each of the areas 4.2.1 through 4.2.7 is stored in the form of area shape control data that defines which of the standard shapes best approximates the area shape, and data that defines the size and location of each of the standard shapes.

Once it has been determined that the present position of the aircraft is within the selected latitude band and the selected zone, the OR gate 140 applies an enabling signal to the AND gate 174. In addition, the selected latitude is subtracted from the present latitude by the summing junction 148 to provide a signal representative of the distance of the present latitude from the selected latitude, that is, a signal representative of the distance C' in FIG. 3. Similarly, the summing junction 150 subtracts the selected longitude from the present longitude to provide a signal representative of the distance of the present longitude from the selected longitude, a distance corresponding to the distance C in FIG. 3. The distances between the present latitudes and longitude from the selected latitudes and longitudes are compared by the comparators 156 and 158 with the region latitude and longitude limits obtained from the region data table. If the distance between the present latitude and the selected latitude is within the region latitude limit, and if the distance between the present longitude and the selected longitude is within the region longitude limit, the comparators 156 and 158 both provide enabling signals to the AND gate 68 which in turn fully enables the AND gate 84 to thereby close a pair of switches 184 and 186 to permit area shape control signals and area shape data signals to be applied to the area processing circuit 108. The area processing circuit 108 operates on the control and data signals to provide data representative of the north and south latitude boundaries and the east and west longitude boundaries of the area.

The area shape data is subtracted from the distance between the present longitude and the selected longitude to provide a signal representative of the longitudinal distance between the longitude coordinate of the selected area and the present position of the aircraft, a distance that corresponds to the distance E in FIG. 3. Similarly, the area shape data is subtracted from the distance between the present latitude and the selected latitude to provide a signal representative of the distance between the latitude coordinate of the area and the present latitude of the aircraft, a distance corresponding to the distance E' in FIG. 3. The longitude distance from the summing junction 152 is compared with the east and the west boundaries of the area received from the area processing circuit 108 by the comparators 162 and 160, respectively. If the distance is within the east and west boundaries, the comparators 160 and 162 fully enable the AND gate 170. Similarly, the latitude distance is compared with the north and south boundaries of the area by the comparators 164 and 166. If the distance is within the north and south boundaries, the AND gate 172 is fully enabled. If the present position of the aircraft is within both the east and west boundaries and the north and south boundaries, the AND gate 176 is enabled by the AND gates 170 and 172 which causes the AND gate 176 to provide a signal which enables the warning modification or the snapshot to take place.

As previously discussed, the warning envelope may be modified by the system according to the invention either to make it more sensitive to provide extended warning times where appropriate, or to make it less sensitive to reduce or eliminate nuisance warnings in areas where such warnings tend to occur. However, when the warning envelope is desensitized, the aircraft is permitted to fly closer to an obstruction than would be the case with an unmodified envelope. Consequently, care must be taken to assure that the readings provided by the various altimeters and other instruments are accurate to assure that the aircraft does not inadvertently impact the ground as a result of an inaccurate instrument reading.

One instrument that may generate an erroneous reading is the barometric altimeter because it is dependent on barometric pressure, and because it must be manually set. Thus, erroneous readings can occur if the barometric altimeter is incorrectly set, or if the barometric pressure changes since the altimeter was set. The reading of the barometric altimeter may be verified or corrected by taking a reading of the radio altitude of the aircraft over terrain having a known elevation, and comparing the reading with the reading of the barometric altimeter. Such a procedure is illustrated in FIG. 5. In FIG. 5, an aircraft 200 is flying over a valley 202 having a known elevation. The elevation of the valley 202 is stored in the memory 42 (FIG. 1) and, more particularly, within the region data table 106 (FIG. 4) as the elevation of an area called a "snapshot area". The snapshot area should be relatively large and relatively flat to permit several radio altitude readings to be taken and averaged in order to provide a more accurate radio altitude determination.

Once it is determined that the aircraft 200 is within a snapshot area, such as the valley 202 (FIG. 5), the radio altitude of the aircraft 200 above the snapshot area 202 is measured by the radio altimeter 16. The radio altitude thus measured is subtracted from the barometric altitude, as the resultant difference is compared with the stored elevation of the valley 202. If the barometric altimeter is correctly set, the difference thus obtained should be equal to the stored elevation of the area 202. If it is not, it is an indication that the barometric altimeter reading is inaccurate. In such an instance, the modification of the warning envelope may be inhibited, or if sufficiently accurate navigational data is available, the reading of the barometric altimeter may be corrected by an amount equal to the amount of the discrepancy. Such a correction may be accomplished by the altitude corrector 48 (FIG. 1) which receives the barometric altimeter reading from the air data computer 12 or from the barometric altimeter, the radio altitude reading from the radio altimeter 16, and the elevation of the snapshot area from the location search logic 44. The altitude corrector 44 may then perform the above-described arithmetic to determine whether or not the barometric altitude is correct. If incorrect, the altitude corrector 48 may either inhibit the warning modification circuit 46, or apply a signal representative of the correct altitude to either the warning modification circuit 46 or to the warning generator 26 so that the corrected altitude may be used in determining the modified warning envelope. While present aircraft generally do not have instruments capable of providing such highly accurate navigational data, an altitude corrector may be provided to make use of such data when it becomes available. Until then, the altitude corrector may simply be used to inhibit the envelope modification whenever a discrepancy between the barometric altitude and the radio altitude reading over known terrain occurs.

When a warning envelope is modified to make it less sensitive to thereby reduce or eliminate nuisance warnings, in many instances other criteria must be relied on to assure that the desensitized warning envelope provides adequate warning time to the pilot. For example, a desensitized envelope may provide adequate warning time only if the aircraft is on the correct glide slope, or is on the correct course or heading. If the aircraft is below the glide slope or has an incorrect course or heading, it may be approaching an area wherein the desensitized envelope may not provide adequate warning. Thus, various parameters, such as, for example, the signal from the glide slope receiver 18 (FIG. 1), the signal from the localizer receiver 24, and the course and heading signals from the navigation system 14 are monitored by the warning modification system 46. The correct course and heading for a predetermined envelope modification area, such as, for example, an approach to an airport, may be stored in the memory 42 and associated with the particular envelope modification area. The correct course and/or heading, may be applied to the warning modification circuit 46 by the location search logic 44 and compared with the actual course and heading. In addition, the signal from the glide slope receiver 18 and for the localizer receiver 24 may also be applied to the warning modification circuit 46. If the aircraft deviates from the glide slope and from the localizer signal by a predetermined amount, for example, plus or minus 2.5 dots, or if the course or heading is off by a predetermined amount, the modification of the warning envelope may be inhibited so that the unmodified warning involved may be used to provide additional protection to the aircraft.

Of course, not all four of the above-described parameters may be applicable to all areas, and only the critical factors to the area need be considered to inhibit the warning envelope modification for any particular area.

Obviously, many modifications and variations of the present invention are possible in light of the above teachings. For example, the comparisons need not be made in the order discussed above, with it being possible, among other things, for example, to make the longitude comparisons prior to making the latitude comparisons. Thus, it is to be understood that, within the scope of the appended claims, the invention may be practiced otherwise than as specifically described above.

What is claimed and desired to be secured by Letters Patent of the United States is:

1. A method for determining the geographic location of a vehicle relative to predetermined geographic areas comprising the steps of:
   storing data representative of predetermined longitudes and latitudes;
   monitoring the present longitude and latitude of the vehicle;
   successively comparing one of the present longitude or latitude with respective longitude or latitude representative data to define one of a longitude or latitude band in which the vehicle is located;
   after said one of said longitude or latitutde bands has been defined, successively comparing the other of the present longitude or latitude with respective stored longitude or latitude representative data within the defined band, to define the other of the longitude or latitude bands in which the vehicle is located, the intersection of said latitude band said longitude band defining a zone;
   retrieving stored data representative of a predetermined region in said zone;
   retrieving stored data representative of a predetermined area in said region; and
   comparing the present longitude and latitude of said vehicle with the retrieved data to determine if the vehicle is located in a region or in an area.

2. The method recited in claim 1 further includng the step of defining a zone by the latitude and longitude of one of its corners.

3. The method recited in claim 2 wherein the step of defining the latitude and longitude of said one corner includes the step of defining the latitude and longitude of the southwest corner of the zone.

4. The method recited in claim 2 wherein the step of retrieving data representative of said predetermined region includes means for retrieving the latitude and longitude of one corner of the region and data representative of the size of the region.

5. The method recited in claim 2 wherein the step of retrieving data representative of the predetermined area includes means for retrieving data representative of the shape and the size of the predetermined area.

6. The method recited in claim 5 wherein the data representative of the shape of the predetermined area includes data representative of one of a plurality of standard shapes.

7. The method recited in claim 6 wherein said standard shapes are geometric shapes.

8. The method recited in claim 1 wherein the step of comparing the present position with stored latitudes is done prior to the step of comparing the present position with stored longitudes.

9. A system for determining whether a vehicle is located in a predetermined area comprising:
   means for monitoring the present longitude and latitude of the vehicle;
   means for storing data representative of predetermined latitudes, and for storing data representative of predetermined longitudes;
   means responsive to signals representative of the present longitude and latitude of the vehicle for successively comparing one of the present longitude or latitude with said respective stored longitude or latitude representative data to define one of a longitude or latitude band in which the vehicle is located;
   after said one of said longitude or latitude bands has been defined successively comapring the other of the present longitude or latitude with said respective stored longitude or latitude representative data within the defined band to define the other of the longitude or latitude band in which the vehicle is located;
   means responsive to said comparisons for defining a zone within which the vehicle is located, said zone being defined by the intersection of said latitude band and said longitude band;
   means for storing data representative of regions and areas within said zones; and
   means for comparing the present latitude and the present longitude with the region and area representative data, and providing an indication when said vehicle is within a region or an area.

10. The system recited in claim 9 further including means responsive to predetermined operational conditions of said vehicle for providing a warning indicative of an imminent impact with terrain according to a predetermined set of criteria, wherein said warning providing system is responsive to said indication providing means for altering said warning criteria whenever said vehicle is present in said area.

11. The system as recited in claim 10 wherein said vehicle is an aircraft and wherein said system forms part of a ground proximity warning system.

12. The system recited in claim 11 wherein said system includes computing means that includes means for determining whether the aircraft is within an area and means for providing said warning, wherein said computing means alternatively makes computations based on said operational conditions to determine whether a warning is to be provided and computations to determine whether the aircraft is in an area.

13. The system recited in claim 10 wherein said computing means makes only a predetermined number of computations to determine whether said aircraft is in an area between making computations to determine whether a warning is to be provided.

14. The system recited in claim 9 wherein said means for storing data representative of regions and areas includes means for storing data representative of the shapes and sizes of said areas.

15. The system recited in claim 14 wherein said shape and size representative data storage means includes means for storing the shape data as one of a plurality of standard shapes.

16. The system recited in claim 15 wherein said standard shapes include mathematically definable shapes.

17. The system recited in claim 16 wherein said standard shapes includes geometric shapes.

18. A ground proximity warning system for aircraft comprising:
   means responsive to predetermined flight conditions of the aircraft for generating a warning in the event of a hazardous flight condition according to a predetermined set of criteria;
   means for altering the predetermined set of criteria whenever the aircraft is in a predetermined geographic area;
   means for monitoring the present longitude and latitude of the aircraft;
   means for storing data representative of predetermined longitudes and latitudes;
   means for determining whether the aircraft is in the predetermined area, said determining means including means for successively comparing one of the present longitude or latitude with the respective stored longitude or latitude representative data defining one of a longitude band or a latitude band in which the vehicle is located; after said one of said longitude or latitude bands has been defined, successively comparing the other of the present longitude or latitude with respective stored longitude or latitude representative data within the defined band to define the other of the longitude or latitude bands in which the vehicle is located; said latitude band and said longitude band defining a zone; said system further including means for defining an area within said zone and means for determining whether said aircraft is within said area.

19. A system as recited in claim 18 wherein said means for determining whether the aircraft is within a latitude band and a longitude band which cooperate to define a zone includes for comparing the present latitude and longitude of the aircraft with stored latitudes and stored longitudes defining zones.

20. A system as recited in claim 19 wherein said means for determining whether the aircraft is in an area includes means for storing the location of said area within said zone and means for comparing the location of said aircraft with the location of said area.

21. A system as recited in claim 20 wherein said means for storing the location of the area within said zone includes means for storing the location of a predetermined portion of said area, the shape of said area and the size of said area.

22. A system as recited in claim 21 wherein said area location storing means includes means for storing the shape of said area as one of a predetermined number of standard shapes.

23. A system as recited in claim 22 wherein said area location storing means includes means for storing said predetermined standard shapes as a mathematically definable standard shapes.

24. A system as recited in claim 23 wherein said area location storing means includes means for storing said mathematically definable standard shapes as geometric shapes.

25. A system as recited in claim 21 wherein said location storing means includes means for storing the location of said predetermined portion of said area with respect to the location of a predetermined portion of said zone.

26. A system as recited in claim 25 wherein said means for storing the location of said predetermined portion of said area within said zone includes means for storing the location of one of the corners of said area with respect to one of the corners of said zone.

27. A system as recited in claim 26 wherein a region further defines a zone further including means for storing the location of a region containing one or more areas within said zone.

28. A system as recited in claim 27 wherein said region location storing means includes means for storing the location of one corner of said region and the size of the region in terms of degrees of latitude and degrees of longitude distance from said corner.

29. A system as recited in claim 20 further including computing means for alternately monitoring flight conditions to determine whether a warning is to be generated and for making said comparisons, said computing means being operative to make only a predetermined number of comparisons between monitoring said flight conditions to determine whether a warning is to be generated.

30. A system as recited in claim 29 further including means for preventing the interruption of said computing means when it is making said comparisons.

31. A system as recited in claim 19 wherein said comparing means includes means for successively comparing the latitude of the aircraft with the stored latitudes.

32. A system as recited in claim 31 wherein said comparing means includes means for providing an indication that the aircraft is within a predetermined latitude band if the present latitude is equal to one of said stored latitudes or greater than one of said stored latitudes and less than the next successive latitude stored.

33. A system as recited in claim 32 wherein said comparing means includes means for successively comparing the longitude of the aircraft with stored zone longitudes within the latitude band in which the aircraft is located to determine whether the aircraft is in a zone defined by the latitude band in which the aircraft is flying and one of said zone longitudes.

34. A system as recited in claim 33 wherein said comparing means includes means for providing an indication that said aircraft is within a predetermined zone if its present latitude is equal to one of said stored latitudes or greater than one of said stored latitudes and less than the next successive stored latitude, and its longitude is equal to one of said stored zone longitudes or greater than one of said stored zone longitudes and less than the next successive stored zone longitude.

35. A system as recited in claim 34 wherein the location of said zone is defined by one of the stored latitudes and one of the stored zone longitudes.

36. A system as recited in claim 35 wherein said zone longitude is further defined by a region having a location and size defined by one of said stored latitudes and one of said stored zone longitudes and the number of degrees of latitude and longitude the region extends from the location defining latitude and zone longitude.

37. A system as recited in claim 36 wherein said storing means further includes means for storing a shape and a location of an area within said region.

38. A system as recited in claim 37 wherein the location of said area is defined by the location of one of the corners of said area with respect to the location of said region.

39. A system as recited in claim 38 wherein said shape of said area is defined by one of a plurality of standard shapes.

40. A system as recited in claim 39 wherein said standard shapes are defined as mathematically definable shapes.

41. A system as recited in claim 40 wherein said mathematically definable shapes are geometric shapes.

42. A system as recited in claim 19 wherein said comparing means includes means for successively comparing the longitude of the aircraft with stored longitudes.

43. A system as recited in claim 42 wherein said comparing means includes means for providing an indication that said aircraft is within a predetermined longitude band if its present longitude is equal to one of said stored longitudes or greater than one of said stored longitudes and less than the next successive stored longitude.

* * * * *

UNITED STATES PATENT AND TRADEMARK OFFICE
CERTIFICATE OF CORRECTION

PATENT NO. : 4,675,823

DATED : Jun. 23, 1987

INVENTOR(S) : Lyle J. Noland, deceased

It is certified that error appears in the above-identified patent and that said Letters Patent is hereby corrected as shown below:

Column 4, line 25, change "$H_b'$" to --$\dot{H}_b$--.

Column 4, line 25, change "$Z_b'$" to --$\dot{Z}_b$--.

Column 10, line 14, change "104" to --106--.

Column 11, line 66, change "68" to --168--.

Column 11, line 67, change "84" to --174--.

Column 13, line 22, change "44" to --48--.

Column 14, line 21-22, change "longitudes and latitudes" to --longitude and latitude bands--.

Column 14, line 36, after "band" insert --and--.

Column 14, line 45, change "includng" to --including--.

Column 15, line 18, change "comapring" to --comparing--.

Column 15, line 54, change "10" to --12--.

Column 15, line 56, change "aircraft" to --vehicle--.

Column 16, line 2, change "includes" to --include--.

Column 16, line 36, after the word "includes" insert the word --means--.

Column 16, line 51, delete the word "predetermined".

UNITED STATES PATENT AND TRADEMARK OFFICE
CERTIFICATE OF CORRECTION

PATENT NO. : 4,675,823
DATED : Jun. 23, 1987
INVENTOR(S) : Lyle J. Noland, deceased It is certified that error appears in the above-identified patent and that said Letters Patent is hereby corrected as shown below:

Column 16, Line 52, before "standard" insert --predetermined--.

Column 16, line 55, delete "a".

Column 17, line 4, after "zone" insert --and said system--.

Column 17, line 4, delete "including" and insert --includes--.

Column 17, line 11, after "said" add --one--.

Column 18, line 11, delete "longitude".

Column 18, line 15, insert a hyphen between "location" and "defining".

Column 18, line 16, before "storing" insert --data representative--.

On the Abstract page under the heading [75] inventor, change "Administrator" to --Administratrix--.

IN THE DRAWING FIG. 4A

Add switch number 178 to switch in lower left hand corner to agree with Column 10, lines 18-22.

Signed and Sealed this

Sixteenth Day of August, 1988

Attest:

DONALD J. QUIGG

Attesting Officer

Commissioner of Patents and Trademarks